(12) United States Patent
Scholz

(10) Patent No.: US 12,488,681 B2
(45) Date of Patent: Dec. 2, 2025

(54) DRIVER ASSISTANCE SYSTEM

(71) Applicant: Harman Becker Automotive Systems GmbH, Karlsbad-Ittersbach (DE)

(72) Inventor: Jens Scholz, Ehingen (DE)

(73) Assignee: HARMAN BECKER AUTOMOTIVE SYSTEMS GMBH, Karlsbad (DE)

(*) Notice: Subject to any disclaimer, the term of this patent is extended or adjusted under 35 U.S.C. 154(b) by 223 days.

(21) Appl. No.: 18/327,680

(22) Filed: Jun. 1, 2023

(65) Prior Publication Data
US 2024/0005783 A1  Jan. 4, 2024

(30) Foreign Application Priority Data

Jul. 4, 2022  (EP) .................................... 22182800

(51) Int. Cl.
*G08G 1/01*  (2006.01)
*G06V 10/94*  (2022.01)
(Continued)

(52) U.S. Cl.
CPC ......... *G08G 1/0141* (2013.01); *G06V 20/597* (2022.01); *G08G 1/0112* (2013.01);
(Continued)

(58) Field of Classification Search
CPC .. G08G 1/0141; G08G 1/0112; G08G 1/0129; G08G 1/0133; G08G 1/04; G08G 1/052; G08G 1/096811; G08G 1/096741; G08G 1/096775; G06V 20/597; G06V 10/95; G06V 40/20; B60W 2540/225
See application file for complete search history.

(56) References Cited

U.S. PATENT DOCUMENTS 10,825,339 B2 * 11/2020 Bjersing ................. G08B 21/06
11,731,637 B2 *  8/2023 Yamaoka .......... B60W 30/0956
                                                                701/1
(Continued)

FOREIGN PATENT DOCUMENTS

WO     2020244787 A1   12/2020

OTHER PUBLICATIONS

European Patent Office, Extended European Search Report Issued in Application No. 22182800.7, Dec. 22, 2022, Germany, 9 pages.

*Primary Examiner* — Dale W Hilgendorf
(74) *Attorney, Agent, or Firm* — McCoy Russell LLP

(57) ABSTRACT

A driver assistance system comprising a plurality of monitoring units, each of the plurality of monitoring units mounted to a different one of a plurality of vehicles, and a central server. Each of the plurality of monitoring units is configured to determine a distraction level of a driver of the respective vehicle, and, if it is determined that the driver distraction level exceeds a predetermined threshold, transmit a distraction information message to the central server, wherein the distraction information message includes information about the distraction level and the position at which the distraction level occurred. The central server is configured to collect and evaluate the distraction information messages received from different ones of the plurality of monitoring units, and, the central server is configured to provide notifications to following vehicles that are determined to pass the location on their planned route.

8 Claims, 2 Drawing Sheets

(51) Int. Cl.
  *G06V 20/59* (2022.01)
  *G06V 40/20* (2022.01)
  *G08G 1/04* (2006.01)
  *G08G 1/052* (2006.01)
  *G08G 1/0967* (2006.01)
  *G08G 1/0968* (2006.01)

(52) U.S. Cl.
  CPC ......... *G08G 1/0129* (2013.01); *G08G 1/0133* (2013.01); *G08G 1/04* (2013.01); *G08G 1/052* (2013.01); *G08G 1/096811* (2013.01); *B60W 2540/225* (2020.02); *G06V 10/95* (2022.01); *G06V 40/20* (2022.01); *G08G 1/096741* (2013.01); *G08G 1/096775* (2013.01)

(56) References Cited

U.S. PATENT DOCUMENTS

| | | | |
|---|---|---|---|
| 2004/0183685 A1* | 9/2004 | Strumolo | G08B 21/06 340/575 |
| 2016/0150070 A1* | 5/2016 | Goren | G06V 20/58 455/418 |
| 2016/0267335 A1* | 9/2016 | Hampiholi | G06V 20/597 |
| 2017/0098373 A1* | 4/2017 | Filley | H04W 4/90 |
| 2017/0190306 A1* | 7/2017 | Aoki | G06V 20/597 |
| 2017/0236411 A1* | 8/2017 | Sumers | H04W 4/027 701/117 |
| 2018/0127001 A1* | 5/2018 | Ricci | G08G 1/0145 |
| 2018/0144636 A1* | 5/2018 | Becker | B60W 30/0956 |
| 2018/0357894 A1* | 12/2018 | Bjersing | B60K 28/06 |
| 2019/0162549 A1* | 5/2019 | Fouad | G06V 20/597 |
| 2020/0339133 A1* | 10/2020 | Olsson | B60W 40/08 |
| 2020/0394919 A1* | 12/2020 | Ahmad | H04W 4/44 |
| 2022/0319311 A1* | 10/2022 | Yousaf | G08G 1/0112 |
| 2022/0363266 A1* | 11/2022 | Yasuda | B60W 40/09 |
| 2023/0054974 A1* | 2/2023 | Baig | G06N 3/088 |
| 2023/0368670 A1* | 11/2023 | Balasubramanian | G08G 1/0112 |
| 2025/0148912 A1* | 5/2025 | Jacobson | G01S 17/931 |

* cited by examiner

DRIVER ASSISTANCE SYSTEM

CROSS REFERENCE TO RELATED APPLICATIONS

The present application claims priority to European Patent Application No. 22182800.7, entitled "DRIVER ASSISTANCE SYSTEM", and filed on Jul. 4, 2022. The entire contents of the above-listed application is hereby incorporated by reference for all purposes.

TECHNICAL FIELD

The disclosure relates to a driver assistance system.

BACKGROUND

Driver assistance may include any relief that is provided to an individual associated with a vehicle with the aim of increasing individual protection and enhancing driver experience. A driver may be distracted for many different reasons. Driver distraction or a reduced driver attention resulting from the distraction, however, may increase the risk for accidents. Therefore, driver distraction has a huge impact on road safety. Some distractions may be caused by the driver themselves, e.g., when using a phone while driving or when adjusting the settings of a navigation or entertainment system while driving. Drivers, however, may also be distracted when their attention is drawn to any unexpected events or occurrences that may happen along the route the driver is traveling. Such distractions are generally unforeseeable for the driver of a vehicle. Turning one's head towards a sudden and unexpected occurrence outside of the vehicle is generally a reflex that cannot easily be suppressed. Many people, out of curiosity, even tend to give attention to such occurrences for a long period of time. During this time, driver attention with regard to the traffic may be significantly reduced. This may increase the risk for accidents.

Many advanced driver assistance systems (ADAS) are known that monitor a driver's attention level/distraction level and generate a warning if it is detected that the attention level decreases and/or the distraction level increases. Such warnings may increase a driver's attention momentarily. However, warning signals of any kind (e.g., acoustical, visual, or haptic) may be perceived as disturbing or even annoying by a driver. In some cases, warning signals may even be generated too late, especially when a driver's attention is drawn to a suddenly appearing unexpected occurrence. Hence, there is a need for a driver attention system and a method that reduce or even entirely prevent driver distraction caused by events or occurrences that may happen along the route the driver is traveling.

SUMMARY

A driver assistance system of the present disclosure includes a plurality of monitoring units, each of the plurality of monitoring units mounted to a different one of a plurality of vehicles, and a central server. Each of the plurality of monitoring units is configured to determine a distraction level of a driver of the respective vehicle, and, if it is determined that the driver distraction level exceeds a predetermined threshold, transmit a distraction information message to the central server, wherein the distraction information message includes information about the distraction level and the position at which the distraction level occurred. The central server is configured to collect and evaluate the distraction information messages received from different ones of the plurality of monitoring units, and, if a number of distraction information messages that are received for one and the same location during a defined period of time exceeds a defined number of messages, or if an increased number of distraction information messages is received for one and the same location regularly or at recurring points in time, the central server is configured to provide notifications to following vehicles that are determined to pass the location on their planned route.

The present disclosure further provides a method for reducing driver distraction. The method includes determining the distraction levels of drivers of a plurality of vehicles by means of a plurality of monitoring units, each of the plurality of monitoring units mounted to a different one of the plurality of vehicles. If it is determined that the driver distraction level of a driver exceeds a predetermined threshold, a distraction information message is transmitted to the central server by means of the respective monitoring unit, wherein the distraction information message includes information about the distraction level and the position at which the distraction level occurred. The method further includes collecting and evaluating the distraction information messages received from different ones of the plurality of monitoring units at the central server, and, if a number of distraction information messages that are received for one and the same location during a defined period of time exceeds a defined number of messages, or if an increased number of distraction information messages is received for one and the same location regularly or at recurring points in time, providing notifications from the central server to following vehicles that are determined to pass the location on their planned route.

Other systems, methods, features and advantages of the present disclosure will be or will become apparent to one with skill in the art upon examination of the following detailed description and figures. It is intended that all such additional systems, methods, features and advantages be included within this description, be within the scope of the invention and be protected by the following claims.

BRIEF DESCRIPTION OF THE DRAWINGS

The arrangement may be better understood with reference to the following description and drawings. The components in the figures are not necessarily to scale, emphasis instead being placed upon illustrating the principles of the invention. Moreover, in the figures, like referenced numerals designate corresponding parts throughout the different views.

DETAILED DESCRIPTION

As required, detailed embodiments of the present invention are disclosed herein; however, it is to be understood that the disclosed embodiments are merely examples of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

It is recognized that directional terms that may be noted herein (e.g., "upper", "lower", "inner", "outer", "top", "bottom", etc.) simply refer to the orientation of various components of an arrangement as illustrated in the accompanying figures. Such terms are provided for context and understanding of the disclosed embodiments.

The driver assistance system and related method according to the various embodiments described herein allow to reduce or even entirely avoid driver distraction caused by events or occurrences that may happen along the route the driver is traveling. In this way, the risk for accidents may be significantly reduced. The driver assistance systems and methods of the various embodiments allow to reduce or avoid driver distraction without disturbing or annoying the driver.

Figure 1:
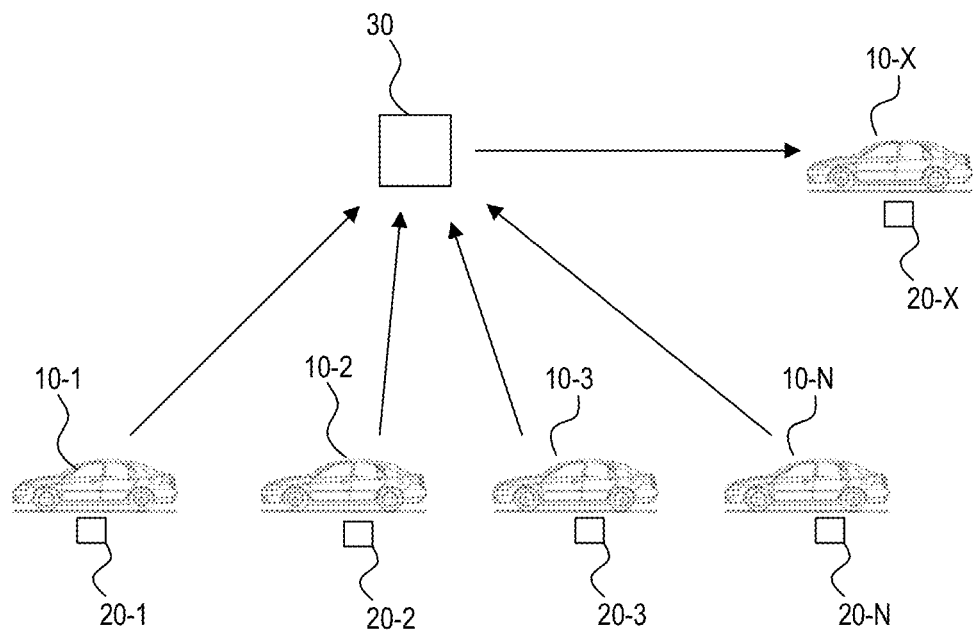
FIG. 1 a driver assistance system according to one embodiment of the present disclosure.

Referring to FIG. 1, an exemplary driver assistance system is schematically illustrated. The driver assistance system includes a central server 30 and a plurality of monitoring units 20-1, 20-2, 20-3, 20-N. Each of the plurality of monitoring units 20-N is mounted on a different one of a plurality of vehicles 10-1 10-2, 10-3, 10-N and is configured to determine a distraction level of a driver of the respective vehicle 10-N. Each of the monitoring units 20-N may include one or more inward facing cameras, for example. Inward facing cameras may capture images of a driver of the vehicle 10-N, for example. A driver's distraction level may be determined, for example, by evaluating the images captured by the inward facing cameras. For example, it may be determined whether a driver is looking ahead onto the road, or whether they are looking away from the road, e.g., out of one of the side windows. Any sudden or unexpected head or eye movements may be detected. It may also be detected whether a driver is looking away from the road (e.g., out of one of the side windows) for a comparably long time. If a driver is not looking ahead on the road but outside one of the side windows instead, for example, it may be assumed that the driver is distracted. The driver distraction level, however, may also be determined in any other suitable way. It is further possible to determine a duration of a distraction. For example, it may be determined whether the driver is only distracted for a short time or for a comparably long time. Many different methods for monitoring a driver's distraction level are generally known.

The driver distraction level may be rated and, if it is determined that the driver distraction level exceeds a predetermined threshold, a distraction information message is transmitted to the central server 30. The distraction information message includes information about the distraction level (severity of the distraction) and the position at which the distraction level occurred. The monitoring units 20-N may communicate with a navigation system of the vehicle 10-N, for example, or may include a position determination unit of any kind (e.g., GPS sensor). In this way, the current position of a vehicle 10-N is known when it is detected that the distraction level exceeds the threshold. A position of a vehicle may be defined by the coordinates (latitude, longitude) of a geographic coordinate system.

When rating the driver distraction level, it is optionally also possible to further consider a velocity of the vehicle at the time of the distraction. If, for example, the velocity of the vehicle 10-N is zero (e.g., because the driver is waiting at a red traffic light or is caught in a traffic jam), a distraction may be considered less severe, even if the driver is looking out of the side windows for a longer time. In such situations it may be considered, for example, that the driver is merely whiling away time until they can continue the drive. A distraction may be considered to be more severe if the driver is driving at a high velocity, for example.

The central server 30 collects distraction information messages received from different ones of the plurality of monitoring units 20-N and evaluates them. If it is detected, that a number of distraction information messages that is received for one and the same location P1 within a certain period of time exceeds a defined number of messages, it may be assumed that an event occurring at the concerned location P1 which distracts the drivers of different vehicles 10-N continues for a long time or may be even permanent. It is also possible that certain events or situations occur repeatedly at similar times (e.g., every day at the same time, or every Monday at the same time). This may also be determined by evaluating the respective distraction information messages. If a continuing or repeating event or situation is detected, the central server 30 is configured to provide notifications to vehicles 10-X that are determined to pass the location P1 on their planned route. A location P1 may include a plurality of positions within a defined radius. The positions of the different vehicles transmitted to the central server may not be identical, but may be within a defined area. According to one example, a location P1 covers an area having a radius of several meters, or several tens of meters. Even a radius of one hundred meters or more, e.g., up to 500 m, may still be considered as the same location P1. According to another example, all positions along a certain section of a road may be considered as being at the same location. The section of the road may have a length of several meters, or several tens of meters. Even a length of one hundred meters or more, e.g., up to 500 m, may still be considered as the same location P1.

For example, if an event occurs that distracts the drivers of a plurality of different vehicles 10-N, and the event lasts for a comparably long time, the number of distraction information messages transmitted to the central server 30 will most likely exceed the predetermined threshold after a certain time. Any following vehicles 10-X that are determined to pass the location P1 of the event on their route of travel may then be notified of the event before they reach the location P1. Any vehicle 10-X may provide their current position and, optionally, their intended route, to the central server 30 in regular intervals. The central server e.g., may send a notification if it is determined that a vehicle 10-X approaches a location P1 at which a potentially distracting event has been identified. For example, the drivers of the following vehicles 10-X may receive notifications about an upcoming distraction. In this way, the event is no longer unexpected for the drivers and the distraction level may be lower as compared to drivers which pass the situation unexpected. It is, however, also possible, if the driver follows a route provided to them by a navigation system, that the monitoring unit 20-X receives the notification and causes the navigation system to change the proposed route in order to avoid passing the situation altogether. That is, the route proposed to the driver by the navigation system may be changed in order to bypass the potentially distracting event.

As has been explained above, it may also be possible that the event occurs repeatedly at the same or similar times on different days. That is, the central server 30 might receive an increased number of distraction information messages at the same time of different days. While during other times, the central server 30 receives no or only few distraction notification messages, the number of received distraction information messages may increase during certain repeating time intervals or at certain repeating times. The increase of the number of received distraction information messages may be noticeable, e.g., the difference between a number of distraction notification messages when a potentially distracting event occurs and a number of distraction information messages received during "normal times" may exceed a certain defined threshold. The central server 30 may store such information and, if a vehicle 10-X approaches the location of the event at a time at which the event is expected to occur again, the driver may be notified accordingly or the route provided by a navigation system may be changed accordingly to bypass the event, as has been described above.

The central server 30 may only determine a general location P1 of the potentially disturbing event (e.g., based on latitude and longitude). It is, however, also possible that even more information is collected. For example, if the distraction level of the drivers is determined by a monitoring unit 20-N including at least one camera, it may also be determined on which side of the road the event occurs. The direction of travel of the vehicles 10-N is generally known from the navigation system or a position determination unit with which the current position of the vehicle 10-N can be detected. The images captured by the at least one camera may be evaluated by means of suitable face recognition techniques, for example. In this way it may be determined to which side of the road the driver is turning their head when passing the event. This information may also be included in the distraction information messages transmitted to the central server 30.

Figure 2:
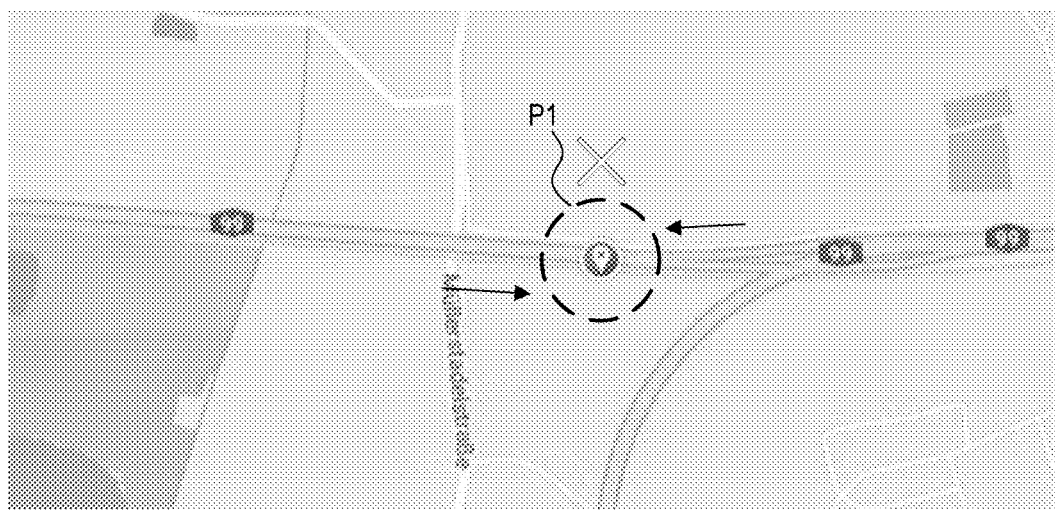
FIG. 2 schematically illustrates a map with a location with an increased risk for driver distraction.

This is schematically illustrated in FIG. 2. FIG. 2 illustrates a section of a map. An event that is potentially distracting has been determined to occur at location P1. For vehicles travelling eastbound, the event occurs to the left side of the road, while for vehicles travelling westbound, the event occurs to the right side of the road. Any following vehicles 10-X (not specifically illustrated in FIG. 2) may be notified accordingly as long as the event is still determined to be occurring at location P1.

It is, however, also possible that the exact location of the event is determined by means of outward facing cameras. It is generally possible to analyze images captured with outward facing cameras and to identify any distracting events in the surroundings of the vehicle. In this way it may also be determined by evaluating the images captured by one or more outward facing cameras on which side of a road a potentially distracting event occurs.

If, after a plurality of distraction information messages have been received by the central server 30 and a potentially distracting event has been identified, no further distraction information messages are received for a defined period of time, it may be assumed that the event no longer occurs and the central server 30 may stop sending notifications to any following vehicles 10-X.

It is also possible, if a distractive event is determined to be permanent, that the central server 30 sends notifications to concerned authorities. In this way, authorities have the possibility to remove any distracting events in order to enhance road safety.

Figure 3:
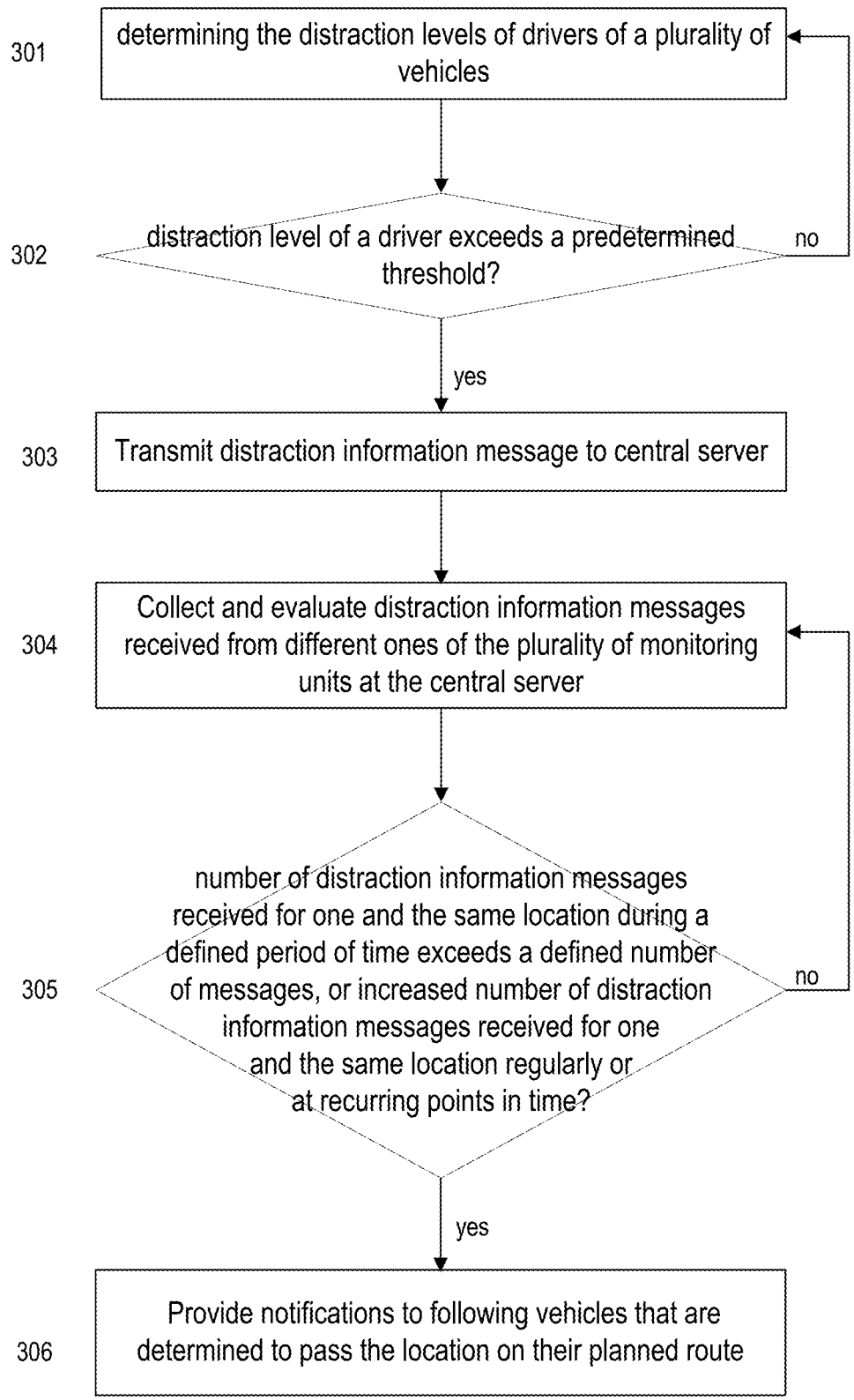
FIG. 3, in a flow diagram, illustrates a method according to one embodiment of the present disclosure.

Now referring to FIG. 3, a method according to one out of several examples is schematically illustrated in a flow diagram. The method includes determining the distraction levels of drivers of a plurality of vehicles by means of a plurality of monitoring units, each of the plurality of monitoring units mounted to a different one of the plurality of vehicles (step 301). If it is determined that the driver distraction level of a driver exceeds a predetermined threshold (step 302), a distraction information message is transmitted to the central server by means of the respective monitoring unit (step 303), wherein the distraction information message includes information about the distraction level and the position at which the distraction level occurred. The method further includes collecting and evaluating the distraction information messages received from different ones of the plurality of monitoring units at the central server (step 304), and, if a number of distraction information messages that are received for one and the same location during a defined period of time exceeds a defined number of messages, or if an increased number of distraction information messages is received for one and the same location regularly or at recurring points in time (step 305), providing notifications from the central server to following vehicles that are determined to pass the location on their planned route (step 306).

The description of embodiments has been presented for purposes of illustration and description. Suitable modifications and variations to the embodiments may be performed in light of the above description or may be acquired from practicing the methods. The described arrangements are exemplary in nature, and may include additional elements and/or omit elements. As used in this application, an element recited in the singular and proceeded with the word "a" or "an" should not be understood as excluding the plural of said elements, unless such exclusion is stated. Furthermore, references to "one embodiment" or "one example" of the present disclosure are not intended to be interpreted as excluding the existence of additional embodiments that also incorporate the recited features. The terms "first," "second," and "third," etc. are used merely as labels, and are not intended to impose numerical requirements or a particular positional order on their objects. The described systems are exemplary in nature, and may include additional elements and/or omit elements. The subject matter of the present disclosure includes all novel and non-obvious combinations and sub-combinations of the various systems and configurations, and other features, functions, and/or properties disclosed. The following claims particularly disclose subject matter from the above description that is regarded to be novel and non-obvious.

The invention claimed is:

1. A driver assistance system comprising:
 a plurality of monitoring units, each of the plurality of monitoring units mounted to a different one of a plurality of vehicles; and
 a central server, wherein
 each of the plurality of monitoring units is configured to:
  determine a distraction level of a driver of a respective vehicle of the plurality of vehicles;
  determine if the driver distraction level exceeds a predetermined threshold; and
  in response to the distraction level exceeding the predetermined threshold transmit a distraction information message to the central server, wherein the distraction information message includes information about the distraction level and a position at which the distraction level occurred, and
 the central server is configured to:
  collect and evaluate the distraction information messages received from different ones of the plurality of monitoring units;
  determine if a number of distraction information messages that are received for the position during a defined period of time or at recurring points in time increases and exceeds a defined number of messages; and in response to the number of distraction information messages increasing and exceeding the defined number of messages, provide notifications of an upcoming distraction at the position to following vehicles that are determined to pass the position on their planned route, wherein each of the plurality of monitoring units comprises at least one camera that is configured to capture images of the driver of the respective vehicle, each of the monitoring units is configured to evaluate the images captured by the at least one camera and, based on the evaluation, determine the distraction level of the driver, and wherein each of the monitoring units is further configured, based on the evaluation of the images captured by the at least one camera, to determine which side of a road with regard to a current position of the respective vehicle a potentially distracting event is occurring and to include the information in the distraction information message.

2. The driver assistance system of claim 1, wherein each of the monitoring units is configured to detect any head or eye movements of the driver of the respective vehicle, and determine the distraction level of the driver based on the detected head or eye movements.

3. The driver assistance system of claim 1, wherein each of the monitoring units is further configured to consider a velocity of the vehicle when determining the distraction level of the driver.

4. The driver assistance system of claim 1, wherein, if a notification is received by a following vehicle, a respective monitoring unit of the following vehicle is configured to present the notification received from the central server to the driver of the following vehicle.

5. The driver assistance system of claim 4, wherein if the notification is received by the following vehicle, the respective monitoring unit of the following vehicle is configured to cause a route presented to the driver of the following vehicle by means of a navigation system to be changed in order to bypass the potentially distracting event.

6. The driver assistance system of claim 1, wherein, if, after a plurality of distraction information messages have been received by the central server and a potentially distracting event has been identified, no further distraction information messages are received by the central server for a further defined period of time, the central server stops sending notifications to any following vehicles.

7. A driver assistance system comprising:
a plurality of monitoring units, each of the plurality of monitoring units mounted to a different one of a plurality of vehicles; and
a central server, wherein
each of the plurality of monitoring units is configured to:
determine a distraction level of a driver of a respective vehicle of the plurality of vehicles;
determine if the driver distraction level exceeds a predetermined threshold; and
in response to the distraction level exceeding the predetermined threshold transmit a distraction information message to the central server, wherein the distraction information message includes information about the distraction level and a position at which the distraction level occurred, and
the central server is configured to:
collect and evaluate the distraction information messages received from different ones of the plurality of monitoring units;
determine if a number of distraction information messages that are received for the position during a defined period of time or at recurring points in time increases and exceeds a defined number of messages; and
in response to the number of distraction information messages increasing and exceeding the defined number of messages, provide notifications of an upcoming distraction at the position to following vehicles that are determined to pass the position on their planned route,
wherein each of the plurality of monitoring units includes an outward facing camera configured, based on evaluation of images captured by the outward facing camera, to determine on which side of a road with regard to a current position of the respective vehicle a potentially distracting event is occurring and to include the information in the distraction information message.

8. A driver assistance system comprising:
a plurality of monitoring units, each of the plurality of monitoring units mounted to a different one of a plurality of vehicles; and
a central server, wherein
each of the plurality of monitoring units is configured to:
determine a distraction level of a driver of a respective vehicle of the plurality of vehicles;
determine if the driver distraction level exceeds a predetermined threshold; and
in response to the distraction level exceeding the predetermined threshold transmit a distraction information message to the central server, wherein the distraction information message includes information about the distraction level and a position at which the distraction level occurred, and
the central server is configured to:
collect and evaluate the distraction information messages received from different ones of the plurality of monitoring units;
determine if a number of distraction information messages that are received for the position during a defined period of time or at recurring points in time increases and exceeds a defined number of messages; and
in response to the number of distraction information messages increasing and exceeding the defined number of messages, provide notifications of an upcoming distraction at the position to following vehicles that are determined to pass the position on their planned route, wherein the central server is configured to determine the number of distraction information messages that are received increases at the position at a same time on different days and provides a notification to following vehicles determined to approach the position at a same time the distraction is expected to occur.

* * * * *